United States Patent [19]

Leiber et al.

[11] Patent Number: 4,933,855
[45] Date of Patent: Jun. 12, 1990

[54] PROPULSION CONTROL FOR VEHICLES

[75] Inventors: Heinz Leiber, Oberriexingen; Klaus Kastner, Stuttgart, both of Fed. Rep. of Germany

[73] Assignee: Daimler-Benz AG, Fed. Rep. of Germany

[21] Appl. No.: 278,444

[22] Filed: Dec. 1, 1988

[30] Foreign Application Priority Data
Dec. 12, 1987 [DE] Fed. Rep. of Germany ....... 3742244

[51] Int. Cl.$^5$ .............................................. B60K 28/16
[52] U.S. Cl. .................. 364/426.3; 180/197; 303/103
[58] Field of Search .................. 364/426.2, 426.3; 180/197; 303/92, 100, 102, 103, 106

[56] References Cited
U.S. PATENT DOCUMENTS

| | | | |
|---|---|---|---|
| 4,233,599 | 11/1980 | Brearley | 303/92 |
| 4,361,871 | 11/1982 | Miller et al. | 303/92 |
| 4,763,262 | 8/1988 | Leiber | 303/100 |
| 4,779,202 | 10/1988 | Leiber | 180/197 |

*Primary Examiner*—Gary Chin
*Attorney, Agent, or Firm*—Evenson, Wands, Edwards, Lenahan & McKeown

[57] ABSTRACT

A control variable propulsion control is obtained by taking the difference between: vehicle acceleration sensed by an accelerated sensor and vehicle acceleration derived from a driven axle or a driven wheel rotational speed as sensed by a high resolution sensor for vehicle speeds below a predetermined speed; and between vehicle acceleration derived from non-driven axle or non-driven wheels via a conventional rotational speed sensor and acceleration derived from speed sensed by the high resolution sensors for vehicle speeds above the predetermined speed.

5 Claims, 2 Drawing Sheets

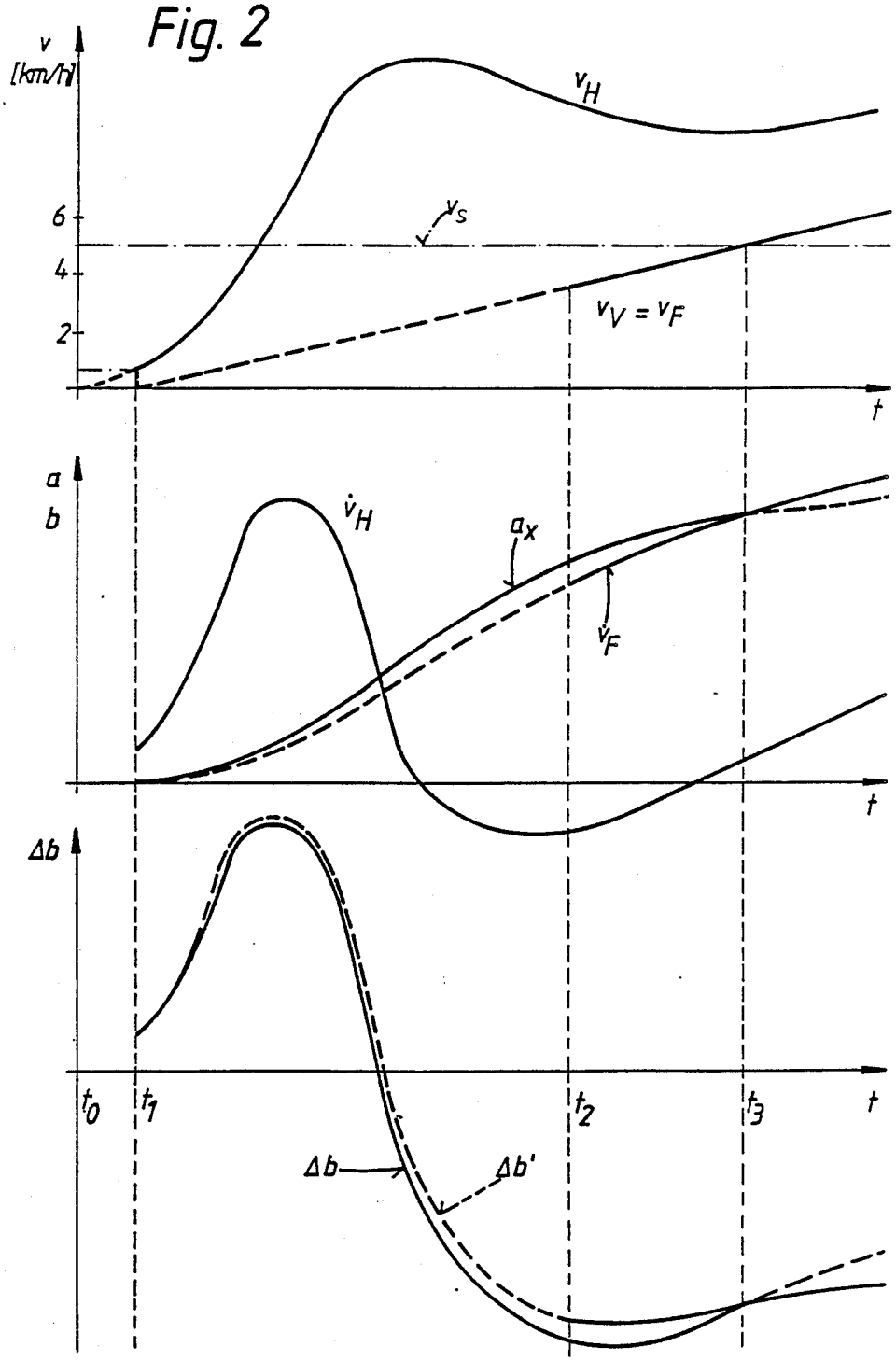

PROPULSION CONTROL FOR VEHICLES

BACKGROUND AND SUMMARY OF THE INVENTION

The invention relates to a propulsion control which uses wheel or axle rotational speed and vehicle longitudinal acceleration as control inputs to a vehicle propulsion control system.

Such a device is shown in U.S. Pat. No. 4,763,262. This device is a drive slip control arrangement with various slip thresholds which are switched over or selected in dependence, among other things, on the vehicle longitudinal acceleration.

It is very important, particularly in the case of propulsion controls, to recognize early when the driven wheels are spinning, for example during the starting from a vehicle standstill. Conventional rotation speed sensor signal can only be obtained above circumferential wheel speeds of approximately 2.5 km/h. In this range, however, there may already be such a large excess torque, that traction and lateral control are very low. It is therefore the aim of an optimum propulsion control system to keep the control deviation as small as possible even in the first control cycle. However, this is hindered by the resolving capacity of the speed-of-rotation sensors. Although high-resolution speed-of-rotation sensors are known, these are not used in series production because of the high cost.

It is therefore the object of the invention to create a propulsion control which enables high excessive torques to be recognized early at supportable costs.

According to the invention, this object is achieved as follows.

According to this, only the sensors of the driven wheels (in the case of four-channel control) or the sensor at the driving pinion of the driven axle (in the case of three-channel control) are high-resolution speed-of-rotation transmitters, while the sensors of the non-driven wheels are inexpensive speed-of-rotation sensors of the conventional type of construction. In a speed range, for example below 5 km/h, in which the sensors of the non-driven wheels do not yet supply a usable signal for the vehicle speed or acceleration, the signal of a difference is formed between the acceleration of the driven wheels or of the driven axle—which is obtained by differentiation of the output signal of the high-resolution sensor or sensors—and the vehicle longitudinal acceleration from the vehicle longitudinal acceleration sensor. The difference is used as control variable which is then processed further in a familiar manner, by comparing it with thresholds, to form control signals for wheel brakes and/or the vehicle driving engine.

After the predetermined speed threshold is exceeded, the system then switches over to the known signal production by the less sensitive sensors of the non-driven wheels to determine the vehicle speed.

In this manner, it is possible to obtain usable signals at justifiable costs from only about 0.3 to 0.5 km/h, instead of the previously usual 2.5 km/h, and thus to prevent excessive torques becoming apparent very early.

An application in a three-channel control system is particularly advantageous since only one single expensive sensor is required at the driving pinion of the driven axle and the former also exhibits a higher speed of rotation than the wheels, so that a usable sensor signal is available here even before one would be available at the wheels. After switching over to the normal speed sensor signal production, this "sensitive" sensor signal can be converted, by frequency conversion, for example by a frequency divider, to a frequency which is directly comparable to the signals of the "insensitive" sensors.

Other objects, advantages and novel features of the present invention will become apparent from the following detailed description of the invention when considered in conjunction with the accompanying drawings.

DETAILED DESCRIPTION OF THE DRAWINGS

Figure 1:
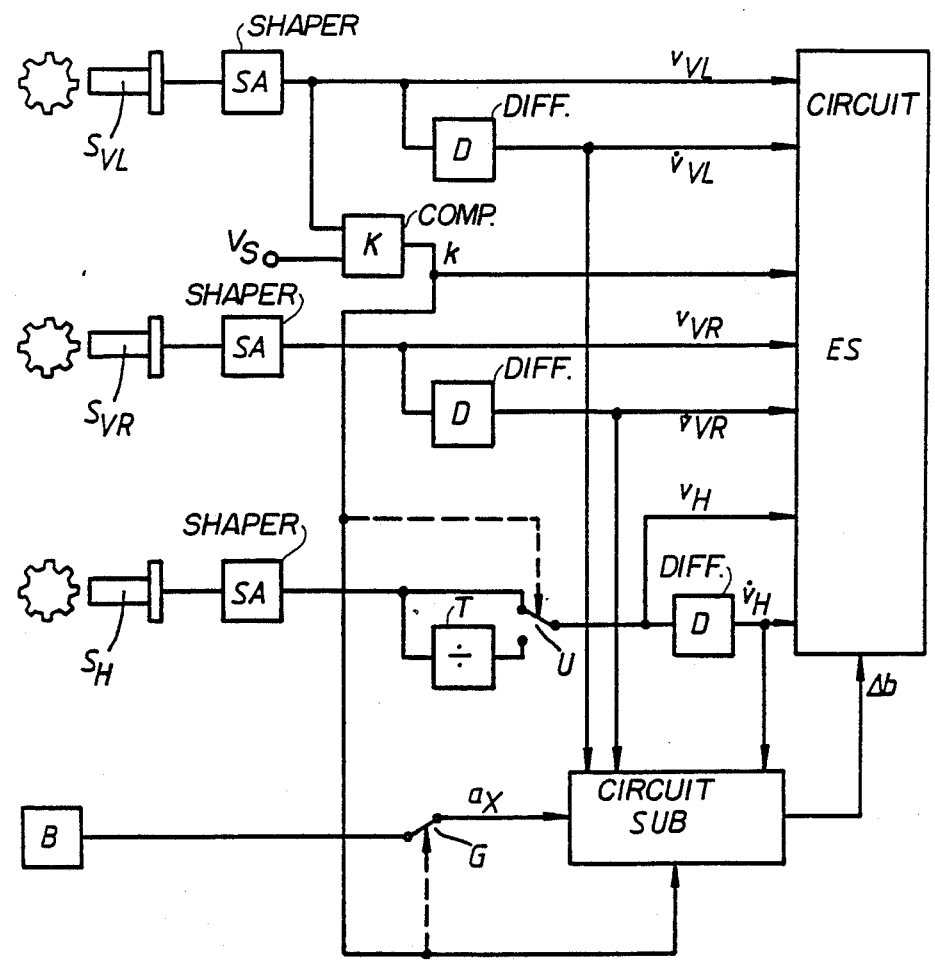
FIG. 1 is a block diagram of a propulsion control system according to the principles of the present invention, and FIG. 2 are graphs on the variation of the signals with time according to the principles of the present invention.

FIG. 1 shows a diagrammatic basic circuit diagram of the invention with reference to a three-channel propulsion control system in which one conventional speed-of-rotation sensor $S_{VL}$ and $S_{VR}$ each is arranged at the non-driven front wheels and a high-resolution speed-of-rotation sensor $S_H$ is arranged at the driving pinion of the driven rear axle.

The signals of the sensors are shaped in subsequent signal shaping circuits SA for further processing and subsequently supplied to the known electronics circuit ES, only indicated, of the propulsion control system in which they are processed, together with other signals, in familiar manner to form control signals for controlling the drive and/or braking torques. Typical examples of control circuits are U.S. Pat. Nos. 4,763,262 and 4,779,202.

From these sensor signals $V_{VL}$, $V_{VR}$ and $V_H$, which represent the wheel or axle speeds of rotation or speeds, the corresponding accelerations $\dot{V}_{VL}$, $\dot{V}_{VR}$ and $\dot{V}_H$ are obtained in one differentiator D each and are also supplied to the electronics circuit ES and to a further circuit SUB.

In addition, a comparator K is provided which compares the instantaneous vehicle speed—derived, for example, from the signal $V_{VL}$ at the left-hand front wheel—with a predetermined threshold value $V_S$, for example 5 km/h. At vehicle speeds above this threshold value, the comparator outputs a High signal k which actuates a switching contact G and a change-over contact U and is fed to the circuit SUB and the electronic circuit ES. The switching contact G is located in a signal path which supplies an output signal $a_x$ of an acceleration transmitter B, which represents the vehicle longitudinal acceleration, to the circuit SUB. It is opened if the vehicle speed is above the predetermined threshold.

With the exemption of the sensors S and possibly the signal shaping circuits SA, all elements are actually integrated in the electronics circuit ES but are here represented outside the circuit for the purpose of a better explanation. In the circuit SUB, the control variable $\Delta b$ is formed which, as long as the comparator output signal k is a Low signal, corresponds to the difference between the main rear wheel acceleration (corresponding to the amplified signal for the acceleration $\dot{V}_H$ of the driving pinion of the driven axle) and the vehicle longitudinal acceleration $a_x$ (output signal of the acceleration transmitter B). As soon as the vehicle speed is above the predetermined threshold and the comparator K accordingly emits a High signal K, the system switches to the control variable Δ b' which is formed from the difference between the mean rear wheel acceleration $\dot{V}_H$—as previously—and the vehicle longitudinal acceleration $\dot{V}_F$ which is now formed from the two front wheel accelerations $\dot{V}_{VL}$ and $\dot{V}_{VR}$ in the circuit SUB. It should be noted that $a_x$ and $\dot{V}_F$ are identical but that the different origin of the two signals is indicated by the different designation.

The circuitry of circuit SUB to perform these functions include appropriate switches and/or logic elements responsive to the signal k from comparator K.

So that the output signal of the sensor $S_H$ after differentiation, that is to say the signal $V_H$ which is matched to the signal $a_x$ of the acceleration transmitter B, can also be adjusted to the signals derived from the front wheel sensors when $\dot{V}_F$ is used to perform the difference in circuit SUB, a divider T is provided which is supplied with the output signal of the sensor $S_H$ and the output signal of which is supplied to the differentiating element via the change-over contact U. The change-over is produced by the output signal k of the comparator K.

FIG. 2 shows the variations of the variables described with time in three diagrams located above one another. In the upper diagram, the mean rear wheel speed of rotation $V_H$ and the vehicle speed $V_F$ formed from the speeds of rotation of the two front wheels are shown.

Dashed curves in FIG. 2 mean that no usable signal of the corresponding variables is available. Accordingly, it can be seen that the output signal of the $V_H$ of the high-resolution sensor $S_H$ is usable from about 0.3 km/h and the vehicle speed signal $V_F$ formed from the two insensitive front wheel sensors $S_{VL}$ and $S_{VR}$ is usable from about 2.5 km/h. A dot-dashed line is also used to show the predetermined speed threshold $V_S$ at which the system switches from the control variable Δb to Δb'.

The center diagram shows the acceleration $\dot{V}_H$ derived from the signal $V_H$, the vehicle longitudinal acceleration $a_x$ obtained from the acceleration transmitter B and the vehicle acceleration $\dot{V}_F$ differentiated from the front wheel signals.

The bottom diagram, finally, shows the two control variables Δb and Δb' which have already been explained.

These diagrams clearly show that, in the case of a vehicle starting from a standstill at time $t_0$, the device according to the invention can be used with justifiable expenditure to obtain a usable signal for the control variable even at time $t_1$ whereas this is only possible at time $t_2$. That is to say about five times as long after the beginning of movement, in the known devices. The system then switches over from the control variable Δb determined by the accelerometer B to the control variable Δb' determined by the insensitive front wheel sensors at time $t_3$. The processing to form control signals is effected in the usual manner for propulsion control systems.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A propulsion controller for a vehicle having non-driven wheels and axle and driven wheels and axle, comprising:
   first sensor means for determining a speed of rotation of at least one of the non-driven wheels and the non-driven axle;
   vehicle longitudinal acceleration sensor means for sensing longitudinal acceleration of said vehicle;
   high-resolution sensor means for determining a speed of rotation of at least one of the driven wheels and the driven axle;
   differentiating means for differentiating the speed of said high-resolution sensor means;
   comparator means for comparing the speed as obtained from first sensor means with a predetermined speed threshold value;
   a circuit means for creating a control signal proportional to a difference between an output signal of said differentiating means and an output signal of said vehicle longitudinal acceleration sensor means as long as the obtained speed from said first sensor means is below the predetermined speed threshold value as determined by the comparator; and
   control means for using said control signal as a control input signal for vehicle propulsion control.

2. Propulsion controller according to claim 1 wherein an output signal of said first sensor means is connected to said comparator means as a vehicle speed.

3. Propulsion controller according to claim 1 including determining means for determining longitudinal acceleration of said vehicle from an output signal of said first sensor means; and wherein said circuit means creates the control signal proportional to a difference between an output signal of said differentiating means and an output signal of said determining means as long as the obtained speed is above the predetermined threshold as determined by the comparator.

4. Propulsion controller according to claim 3 including an adjustment means connecting said high-resolution sensor means and said differentiating means for multiplying said output signal of said high-resolution sensor, which is to be differentiated by said differentiating means, by a predetermined factor as long as the obtained speed from said first sensor means is above said predetermined threshold value as determined by the comparator.

5. Propulsion controller according to claim 3 wherein said determining means includes a differentiating means for differentiating said output signal of said first sensor means.

* * * * *